April 21, 1964  D. O. MYERS  3,129,989
ROTATABLE ELECTRICAL CONNECTION FOR POINTER
Filed Sept. 23, 1960
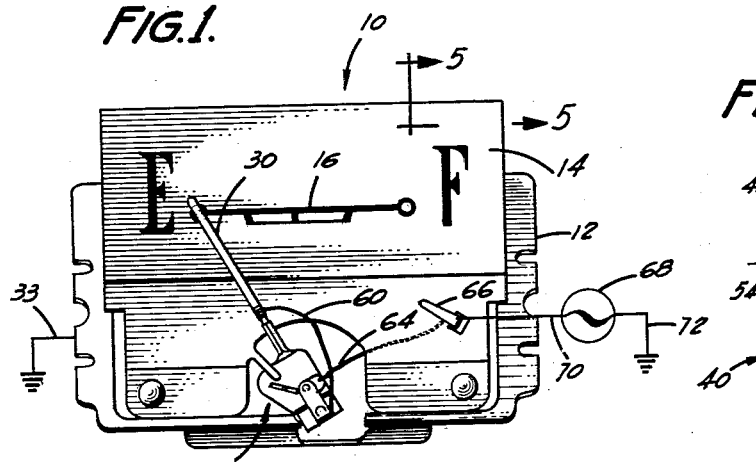
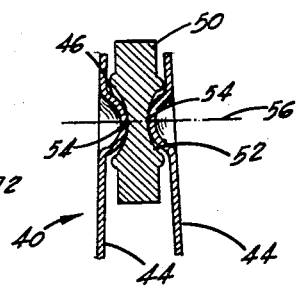
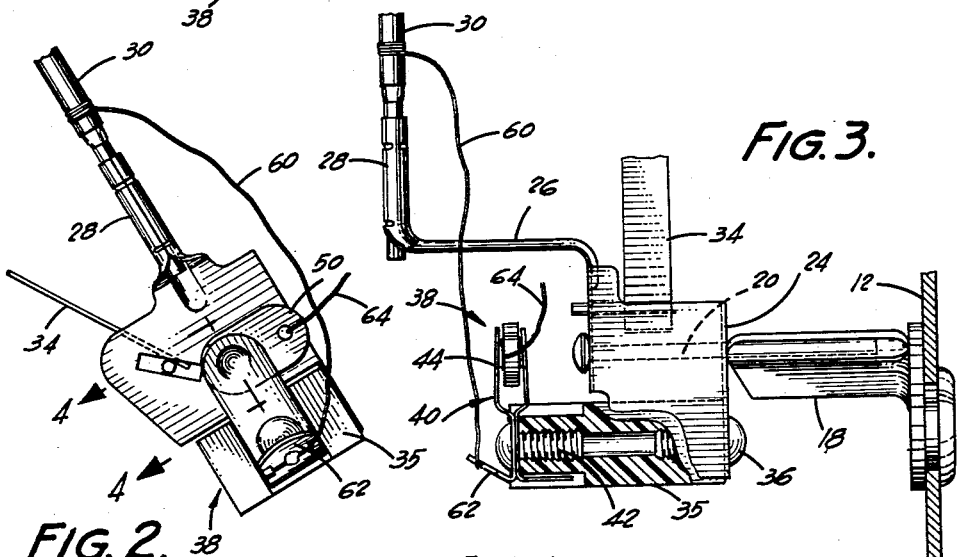
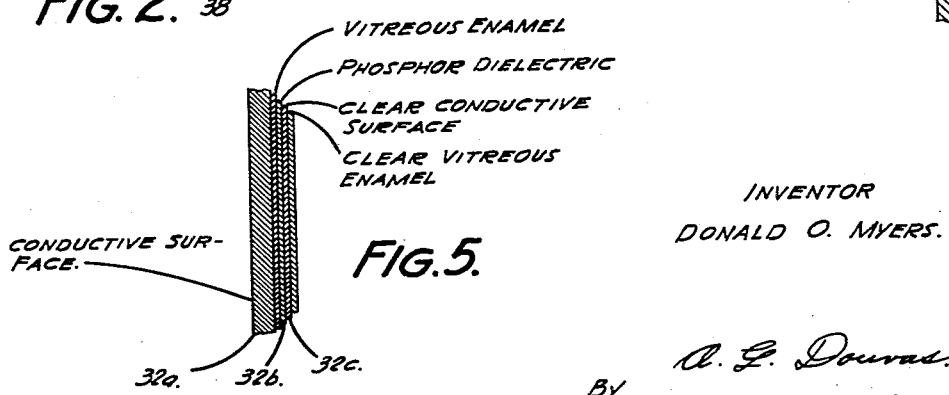
INVENTOR
DONALD O. MYERS.
BY *A. G. Douvas*
ATTORNEY United States Patent Office 3,129,989
Patented Apr. 21, 1964

3,129,989
ROTATABLE ELECTRICAL CONNECTION
FOR POINTER
Donald O. Myers, Elk Grove Village, Ill., assignor to Stewart-Warner Corporation, Chicago, Ill., a corporation of Virginia
Filed Sept. 23, 1960, Ser. No. 58,122
3 Claims. (Cl. 339—2)

This invention relates to an electrical connection between two conductors adapted to rotate relative to one another which causes little if any torque resistance between the conductors.

An object of this invention is to provide a simple inexpensive flexible electrical connection which ensures reliable electrical contact between two conductors adapted to rotate relative to one another.

Another object is to provide an electrical connection between two relatively rotating conductors which causes little if any torque resistance between the conductors.

This invention is particularly adaptable in an instrument gauge having a pointer rotatable across a dial face of the gauge. Electrical connection to the pointer must be flexible to insure rapid and economical assembly of the gauge, but yet must offer little, if any, torque resistance to rotation of the pointer. The invention will best be understood by reference to the accompanying drawings wherein:

FIG. 1 is a front elevational view of a typical instrument gauge using this invention:

FIG. 2 is an enlarged front elevational view similar to FIG. 1 of the gauge pointer mounting structure forming a part of this invention;

FIG. 3 is an elevational view partially in longitudinal section, as seen from the right of FIG. 2;

FIG. 4 is an enlarged sectional view as seen from line 4—4 of FIG. 2; and

FIG. 5 is a greatly enlarged sectional view as seen from line 5—5 of FIG. 1 showing a typical electroluminescent build-up used on the dial face and pointer.

Referring now to the drawing, an instrument gauge 10 includes a casing 12 supporting a dial face 14 having indicia 16 thereon showing a graduated scale. The gauge shown is a typical fuel gauge for indicating the quantity of fuel in an automotive fuel storage tank.

An arbor 18 is secured to the base wall of casing 12 and has a post 20 projecting therefrom. A metallic box-like base 24 is connected to the arbor for rotation about a rotational axis defined by the post 20. A metallic arm 26 projects from one side of the base 24 and has a split connecting portion 28 at its free end. Pointer 30 is clamped in the split portion as is well known in the art, thus being rotatably mounted on the casing to traverse over dial face 14.

FIG. 5 shows a typical electroluminous build-up used on the dial face and the pointer. By applying a pulsating voltage across conductive surfaces 32a and 32c the phosphor dielectric 32b is caused to glow. The conductive surface 32a is general provided by the structure of the pointer 30 and the dial face 14.

The split portion 28, arm 26, base 24, post 20, and arbor 18 provide a circuit from conductive surface 32a of the pointer to the casing and to ground by conductor 33 for establishing one electrical connection to the pointer.

A pointer actuator, such as a bimetal element 34 (the free end only of which is shown), is connected to base 24 to move the pointer across the dial face about post 20, as is well known in the art (see for example Pat. 2,615,085, issued October 21, 1952, to T. J. Smulski entitled Electrical Indicating System.

A block 35 of insulating material such as nylon is secured to base 24 by screw 36 or the like. A split-shaft slip connector 38 consists of a pair of mutually facing substantially identical members 40 connected to the insulator block 35.

The members 40 have flat portions intermediate their ends with aligned openings for receiving a screw 42 which is threaded into insulator block 35. The members 40 are non-rotatably secured to the block and have aligned arms 44 bent outwardly and upwardly away from the flat portions. Members 40 are of resilient conducting material such as of Phosphor bronze with the free ends of the arms 44 being arranged to bias towards each other. Mutually facing aligned convex detent surfaces 46 (FIG. 4) are located on the free ends of arms 44.

A terminal 50 consisting generally of an elongated disk having oppositely facing aligned concave detent surfaces 52 at one end thereof is positioned between the free ends of the arms. The detent surfaces 46 and 52 are generally spherical in shape with concave surface 52 preferably having a larger radius than that of convex surface 46.

Accordingly, the engagements of surfaces 46 with surfaces 52 are on substantialy aligned points 54 generally defining an axis 56 extending through the centers of the spheres, and preferably identical with the pointer rotational axis. When the pointer rotates about post 20 the engagements of spaced arms 44 and the terminal 50 remain aligned with the rotational axis. It is thus obvious the contact arrangement offer very little torque resistance to the pointer since the relatively rotating bracket-terminal engagements are substantially point contacts on the rotational axis of the pointer.

The terminal 50 may be inserted or removed from between the arms 44 by a soft biasing force on the terminal 50 perpendicular to the axis 56. The arms 44 are then resiliently pried open and the surfaces 46 slip into or out of engagement with the surfaces 52.

A conductor 60 connects the T-shaped end 62 of bracket 40 to conductive surface 32c of the pointer. Another conductor 64 connects terminal 50 to a crimp clamp 66 secured to dial face 14. Crimp clamp 66 is insulated from conductive surface 32a of the dial face but is electrically connected to conductive surface 32c of the dial face.

A source of pulsating potential 68 is connected to crimp clamp 66 by conductor 70 and to ground by conductor 72.

An electric circuit thus is completed from source 68, conductor 70, crimp clamp 66, conductor 64, terminal 50 through the contact surfaces 46 and 52 to bracket 40, through conductor 60 to the conductive surface 32c of the pointer, across to conductive surface 32a, and to ground as mentioned above.

Such an electrical connection provides sure reliable electrical contact for all angular positions of the pointer while yet offering little if any torque resistance to the pointer.

What is claimed is:
1. In an instrument gauge having a pointer supported on structure pivotally mounted to rotate as a unit about a rotational axis, the improvement being an electrical contact arrangement to the pointer of electrical potential independent of that of the pointer structure, comprising a pair of resilient electroconductive arms parallely mounted on the structure and each having a free end with mutually adjacent faces movable toward and away from each other generally in line with the rotational axis, said arms being electrically insulated from the pointer support structure, a pair of detent surfaces located on the faces defined as segments of a sphere with a given di- ameter having their centers on the rotational axis, an elongated electroconductive plate member disposable between the free ends, a pair of oppositely faced detent surfaces on the plate member defined as segments of spheres of a given diameter, respectively, one of said pair of detent surfaces being concave, the other of said pair of detent surfaces being convex, with the diameter of the sphere defining the concave detent surfaces being slightly larger than the diameter of the sphere defining the convex detent surfaces, so that the pairs of detent surfaces are engageable on spaced substantially point contacts defining an axis substantially identical with the rotational axis, electroconductive means fixed to the arms and the pointer and held stationary relative to both upon rotation of the pointer about the rotational axis, and means to connect an electrical potential across the pointer structure and plate member.

2. A contact arrangement for a pointer supported by pointer support structure to rotate about a fixed rotational axis and electrically connected to the pointer support structure, comprising a pair of resilient electroconductive arms each connected to but electrically insulated from the pointer support structure and each having a free end on the axis movable toward and away from each other along the axis against the resiliency of the arm, mutually facing aligned convex surfaces on the free ends each defined as a segment of a sphere with its center on the rotational axis and having a given diameter, an elongated plate member disposable between the free ends and having aligned concave surfaces on opposite sides thereof each defined as a segment of a sphere of a given diameter, with the diameter of the sphere defining the concave surfaces being slightly larger than the diameter of the sphere defining the convex surfaces, so that said pairs of surfaces engage on substantially point contacts on the rotational axis and electroconductive means between the pointer and the arms effective to define an electrically complete path through the plate member, arms, pointer and the pointer support structure.

3. A rotatable electrical contact arrangement for a pointer, comprising means including a frame to support the pointer to pivot about a rotational axis, said support means also forming one side of an electric potential to the pointer, a pair of resilient electroconductive arms having adjacent ends secured to but electrically insulated from the support means, the inside faces of the opposite ends of the arms being movable in line with the rotatable axis toward and away from each other against the resiliency of the arms, a terminal formed from an elongated planar disk shaped plate insertable between the inside faces of the arms moving the ends away from each other, generally convex and concave aligned surfaces on the inside faces and on the opposite sides of the terminal mutually engageable on spaced areas of contact generally aligned with the rotational axis, the convex surfaces having a greater rate of curvature at the areas of contact than the concave surfaces, so that the areas of contact substantially are reduced to align points of contact for providing a low torque resistance pivotal connection and an electrical contact between the arms and terminal, and electroconductive means between the pointer and the arms defining a series circuit through the arms and terminal to the other side of the electrical potential to the pointer.

References Cited in the file of this patent
UNITED STATES PATENTS

| | | |
|---|---|---|
| 2,224,343 | Grimaldi | Dec. 10, 1940 |
| 2,300,362 | Shotter | Oct. 27, 1942 |
| 2,475,051 | Raymond | July 5, 1949 |
| 2,523,354 | Butler | Sept. 26, 1950 |
| 2,595,011 | Singer | Apr. 29, 1952 |
| 2,733,367 | Gillson | Jan. 31, 1956 |
| 2,791,723 | Nagy | May 7, 1957 |
| 2,792,803 | Hardesty | May 21, 1957 |
| 2,846,649 | Hornauer | Aug. 5, 1958 |
| 2,872,567 | Strange | Feb. 3, 1959 |
| 3,054,054 | Donker | Sept. 11, 1962 |